United States Patent
Marcy

[19]

[11] Patent Number: 6,099,015
[45] Date of Patent: Aug. 8, 2000

[54] HITCH SYSTEM FOR GOOSENECK TRAILER

[75] Inventor: Dewey R. Marcy, Greeley, Colo.

[73] Assignee: Quick-Hitch, Inc., Greeley, Colo.

[21] Appl. No.: 09/414,212

[22] Filed: Oct. 7, 1999

Related U.S. Application Data

[60] Provisional application No. 60/104,489, Oct. 16, 1998.

[51] Int. Cl.[7] .............................. B62D 53/06; B60D 1/06
[52] U.S. Cl. ..................... 280/433; 280/511; 280/491.5; 280/901
[58] Field of Search .................................. 280/433, 511, 280/423.1, 491.5, 504, 901

[56] References Cited

U.S. PATENT DOCUMENTS

| | | | |
|---|---|---|---|
| 2,877,025 | 3/1959 | Jay .......................................... | 280/433 |
| 3,336,051 | 8/1967 | Dale ..................................... | 280/901 X |
| 4,256,324 | 3/1981 | Hamilton ................................ | 280/433 |
| 4,546,994 | 10/1985 | Taylor .................................. | 280/511 X |
| 4,657,274 | 4/1987 | Mann et al. ............................. | 280/433 |
| 5,016,898 | 5/1991 | Works et al. ............................ | 280/433 |
| 5,143,393 | 9/1992 | Meyer ................................... | 280/433 X |
| 5,169,168 | 12/1992 | Harry et al. ............................ | 280/511 |
| 5,246,244 | 9/1993 | Colibert ............................... | 280/433 X |
| 5,472,222 | 12/1995 | Marcy .................................... | 280/433 |
| 5,860,671 | 1/1999 | Mackeown .............................. | 280/511 |
| 5,871,222 | 2/1999 | Webb ..................................... | 280/511 |

*Primary Examiner*—Paul N. Dickson
*Assistant Examiner*—F.. Zeender
*Attorney, Agent, or Firm*—Dean P. Edmundson

[57] ABSTRACT

A hitch system is described for a towing vehicle (e.g. a pickup truck) to enable the vehicle to tow a gooseneck trailer. The hitch system includes a mounting bracket to be attached to the frame of the vehicle, a sleeve secured to the mounting bracket and including a vertical slot in the wall and a second slot communicating with the vertical slot, a ball hitch which slides into the sleeve and including a pin which projects outwardly to be received in the vertical slot (after which the pin moves into the second slot when the ball is rotated), and a lock for preventing rotation of the ball when the pin is in the second slot. After the ball has been inserted into the sleeve and rotated, it is locked in position and will not come out during normal use of the hitch system.

9 Claims, 5 Drawing Sheets

HITCH SYSTEM FOR GOOSENECK TRAILER

CROSS-REFERENCE TO RELATED APPLICATION

This application is based upon, and claims the benefit of, my copending provisional application Ser. No. 60/104,489, filed Oct. 16, 1998.

FIELD OF THE INVENTION

This invention relates to a hitch system for installation on a truck to enable towing of a gooseneck trailer by the truck. More particularly, this invention relates to a hitch assembly for use with the cargo bed of a truck.

BACKGROUND OF THE INVENTION

A variety of hitch systems have been used in the past for enabling a gooseneck trailer to be connected to a towing vehicle such as a pickup truck. See, for example, U.S. Pat. Nos. 2,877,025; 4,256,324; 4,546,994; 4,657,274; 5,016,898; and 5,472,222.

However, these has not heretofore been provided a hitch system having the features and advantages provided by this invention.

SUMMARY OF THE INVENTION

In accordance with the present invention there is provided a hitch system which can be mounted in the cargo bed of a truck (e.g. a pickup truck) for towing gooseneck trailers. The hitch system comprises, in a preferred embodiment, the following:

(a) a mounting bracket for attachment between spaced frame members of the vehicle;

(b) a tubular sleeve member secured to the mounting bracket, the sleeve member having a wall which includes (i) a first vertical slot therein which extends downwardly from the top edge of the wall, and (ii) a second slot (preferably vertical) spaced from and communicating with the first slot, the second slot not extending to the top edge of the wall;

(c) ball hitch means including a base means which is sized to enable the base means to slide into the upper end of the sleeve member; wherein the base means further includes a pin member projecting outwardly from the base means and capable of being received in the first vertical slot; and (d) lock means for preventing rotation of the ball hitch means when the pin member is located in the second (preferably vertical) slot; wherein the ball hitch means can be rotated about its longitudinal axis after being inserted into the sleeve member in a manner such that the pin member travels from the first slot to the second slot and is captured therein (i.e. the ball hitch is prevented from being removed from the sleeve member due to the location of the pin member in the second slot). For example, the second slot may include a lower portion which extends downwardly below the opening between the first and second slots, and when the pin member drops into that lower portion of the second slot it is effectively captured there and the ball hitch means is prevented from rotating relative to the sleeve member.

Thus, the ball hitch is easily inserted into the sleeve member when the pin member is aligned with the first vertical slot. Then when the ball is rotated slightly, the pin moves into the second (preferably vertical) slot (which does not extend to the top of the sleeve).

The lock means prevents reverse rotation of the ball hitch means. The lock means may comprise the lower portion of the second slot being lower than the opening between the first and second slots for receiving the pin member. Other types of lock means may also be used.

In order to remove the ball hitch from the sleeve, the lock means is deactivated (e.g. the ball hitch means is lifted to free the pin member from the lower portion of the second slot) and the ball hitch is then simply rotated until the pin is again located in the first slot. Then the ball hitch can be lifted vertically to separate it completely from the sleeve member.

The ball hitch system of this invention is very easy to use and it is safe because the ball hitch cannot be inadvertently or accidentally removed from the sleeve member during use in towing a trailer. If desired, the ball hitch can be removed from the sleeve member, turned upside down, and then inserted into the sleeve member so that the ball does not interfere with normal use of the cargo bed of the vehicle. Preferably the ball has a diameter which is slightly less than the inside diameter of the sleeve member.

Other features and advantages of the hitch system of the invention will be apparent from the following detailed description and the accompanying drawings.

BRIEF DESCRIPTION OF THE DRAWINGS

The invention is described in more detail hereinafter with reference to the accompanying drawings.

DETAILED DESCRIPTION OF THE INVENTION

Figure 1A:
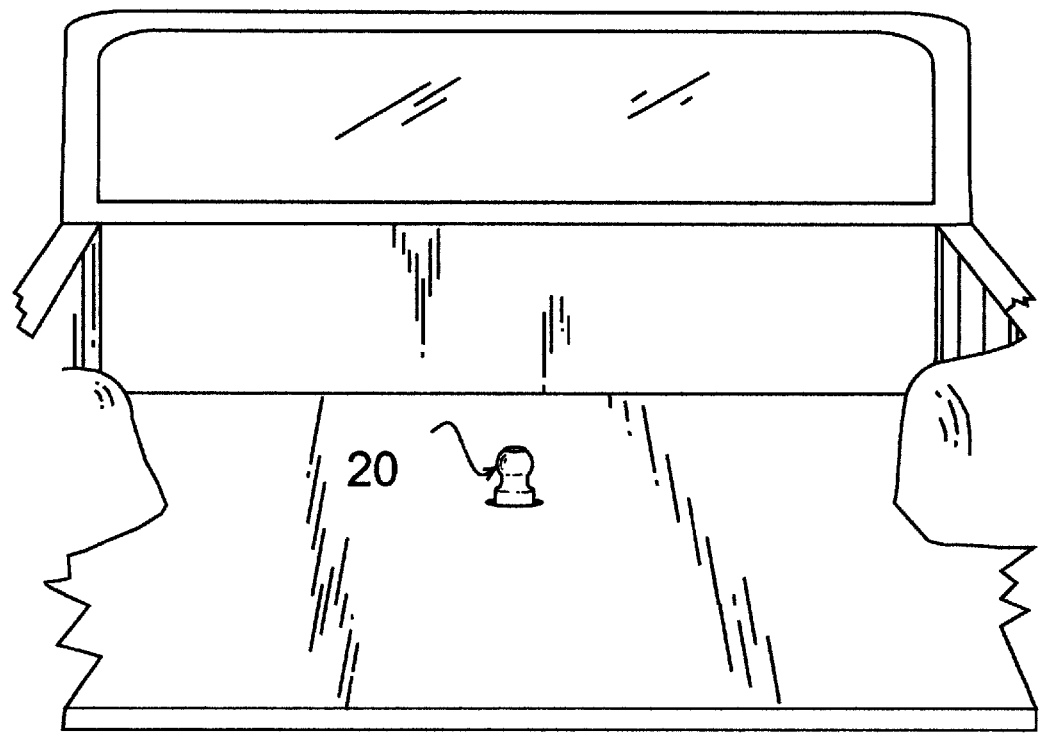
FIG. 1A is rear perspective view of a cargo bed of a truck in which the hitch system of the invention has been installed.

In the drawings there is shown a hitch system 10 of the invention which comprises a cross-member 12 and adjustable end mounting brackets 14 which are bolted to the cross-member and also are bolted to spaced parallel frame members of the vehicle. The mounting brackets are adjustable relative to cross-member 12 so that the hitch system will fit any type or size of towing vehicle.

A tubular sleeve member 16 (preferably cylindrical) is secured in the cross-member (preferably in the center portion of the cross-member). It is also preferable for the upper end of the sleeve member to be flush (or nearly flush) with the upper surface of the cross-member.

The ball hitch 20 includes a generally circular or round ball 21 secured to or integral with a base means 22. Preferably the base 22 has a circular cross-section. A pin member 23 projects outwardly from the side of the base. Preferably there is also a similar pin 23 on the opposite side of the base ( or a single pin can extend completely through the base and project outwardly from opposite sides of the base). The pin preferably is securely mounted to the base means in a stationary position.

Figure 3:
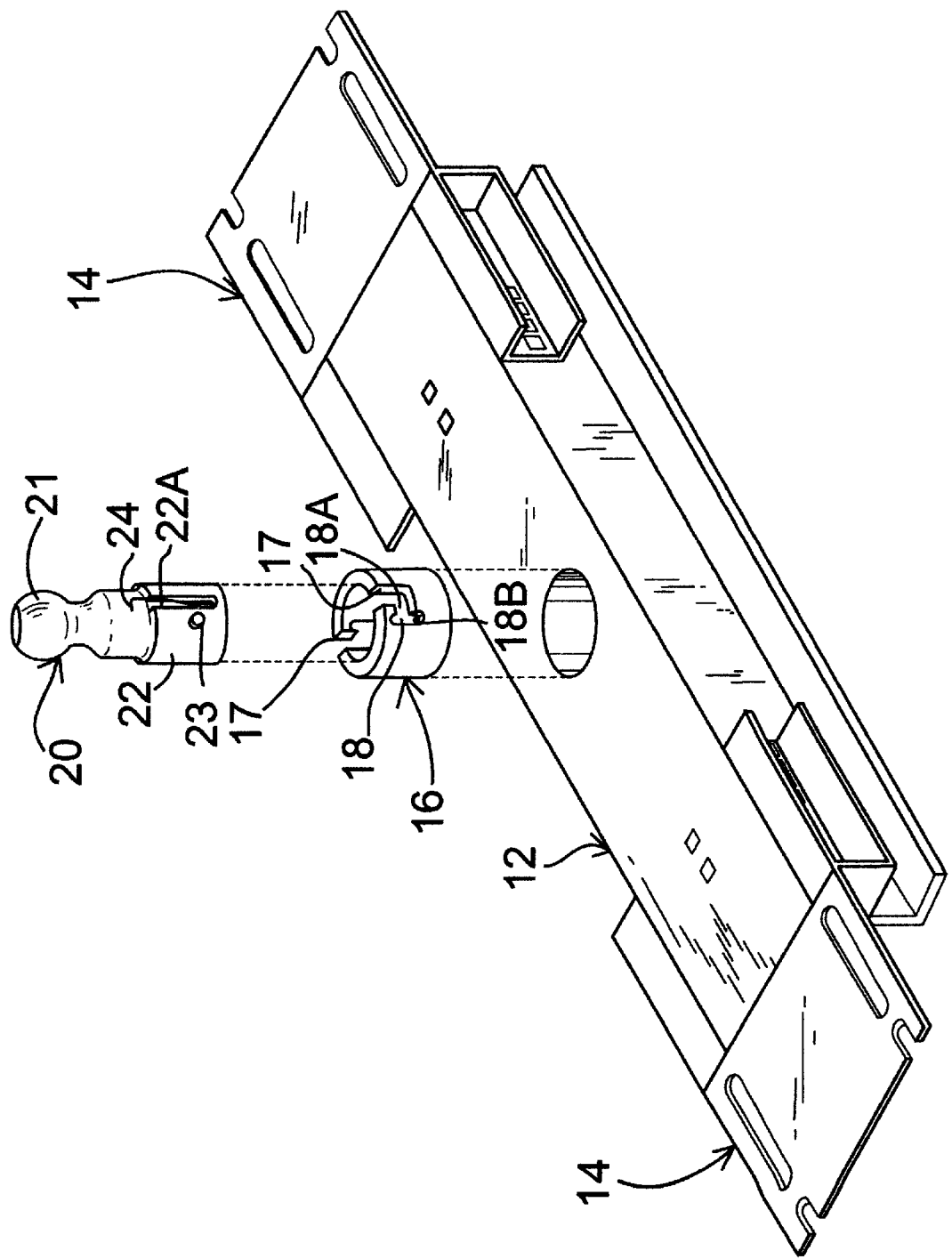

The base 22 also preferably includes a vertical groove or channel 22A on the side. In one embodiment, a lock means 24 may comprise a lever or finger which is secured at its lower end to the base 22 (preferably in channel 22A). The upper end of the lever is biased outwardly beyond the edge of the base 22. The lever may be a spring-loaded device or it may be composed of spring steel or the like. Alternatively, any device which blocks the vertical slot 17 to prevent pin 23 from moving through area 18A back into slot 17 will also work in this invention. Such device could be as simple as a key which is inserted into slot 17 after pin member 23 has moved into area 18A or slot 18 in FIG. 3.

When the base 22 is slidably inserted into the sleeve member 16, and the pin 23 is aligned with vertical slot 17, the base can slide downwardly until the pin reaches the bottom of slot 17. As this is done, the lever 24 is urged into the channel 22A. Then the ball and base can be rotated slightly relative to the sleeve member so that the pin 23 is moved through area 18A to a preferably vertical slot 18. Slot 18 preferably includes a lower portion 18B which extends downwardly below the level of the area 18A. When the pin member 23 is able to drop into portion 18B, this arrangement effectively locks the ball and base and prevents them from rotating relative to the sleeve 16 during normal usage.

Figure 5:
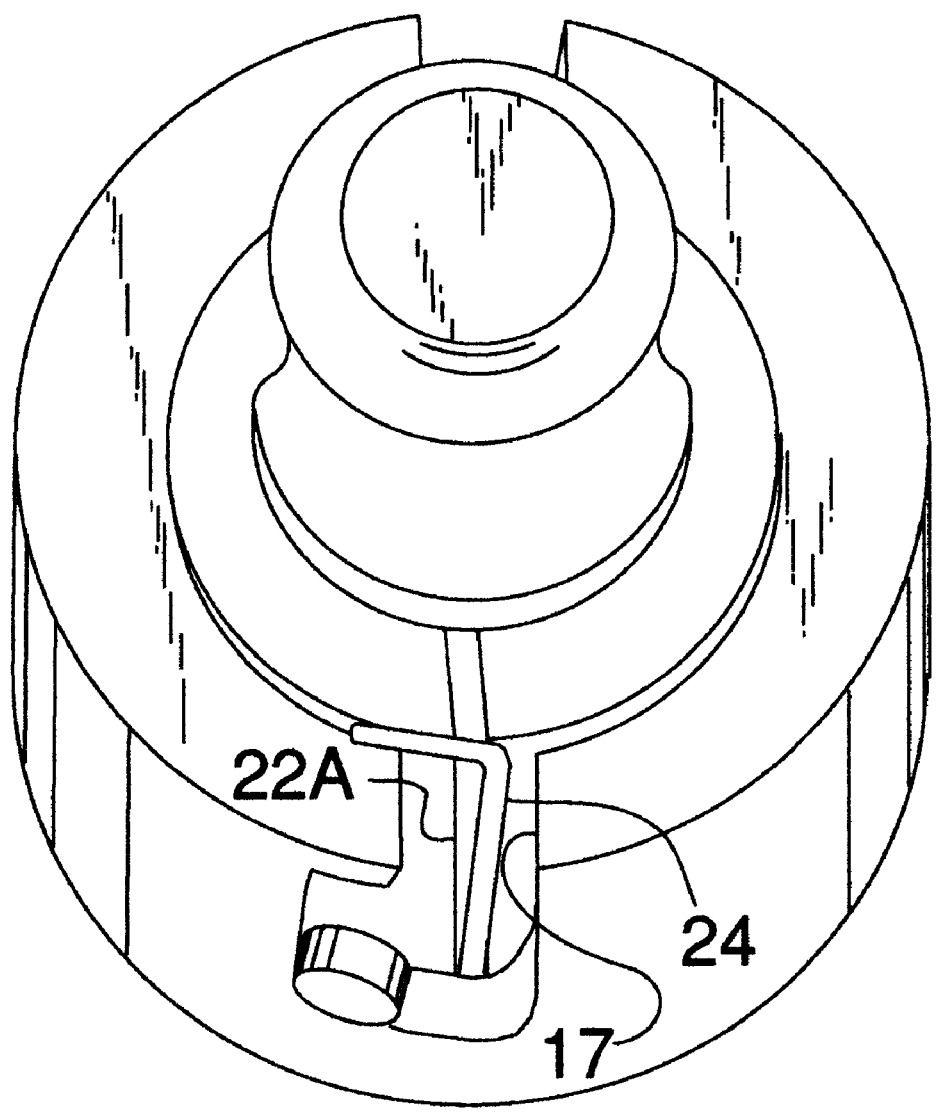
FIG. 5 is a top view of the ball hitch captured in the sleeve member.

When the pin member 23 passes into slot 18 during installation, the upper portion of lever 24 springs outwardly into vertical slot 17 (see FIG. 5). This feature is an additional safety mechanism to assure that the ball and base remain locked in the sleeve 16 (even if the ball and base are raised slightly relative to the sleeve member). The pin 23 in slot 18 prevents the base from being lifted completely out of the sleeve, and the presence of lever 24 in slot 17 prevents the base 22 from rotating relative to the sleeve (even if the ball and base are raised sufficiently to position pin 23 at a level with area 18A).

In order to free the base from the sleeve, the lever 24 is urged away from sleeve 16 and toward the ball so that the lever is moved out of slot 17. Then the ball is lifted to align pin 23 with horizontal slot area 18A, after which the ball can be rotated until pin 23 is located in slot 17. Then the ball and base can be lifted upwardly out of the sleeve. Other types of locking means may also be used to secure the base 22 in sleeve 16.

Figure 1B:
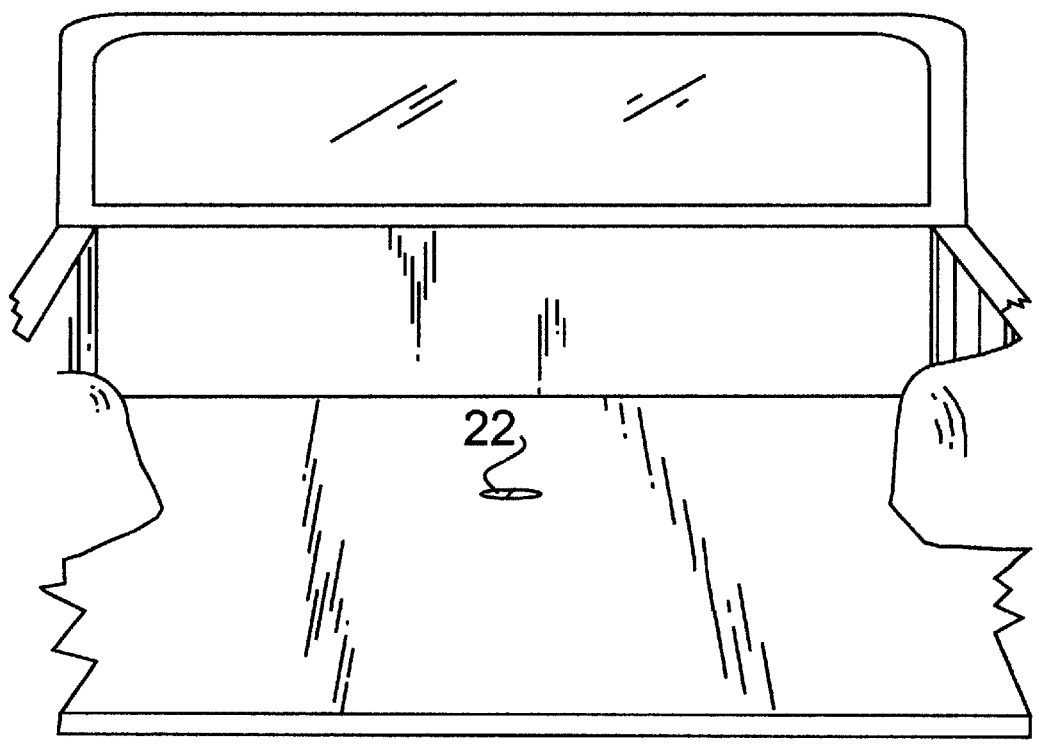
FIG. 1B is a rear perspective view of the truck with the ball hitch inverted and inserted into the receiving sleeve member.
Figure 2:
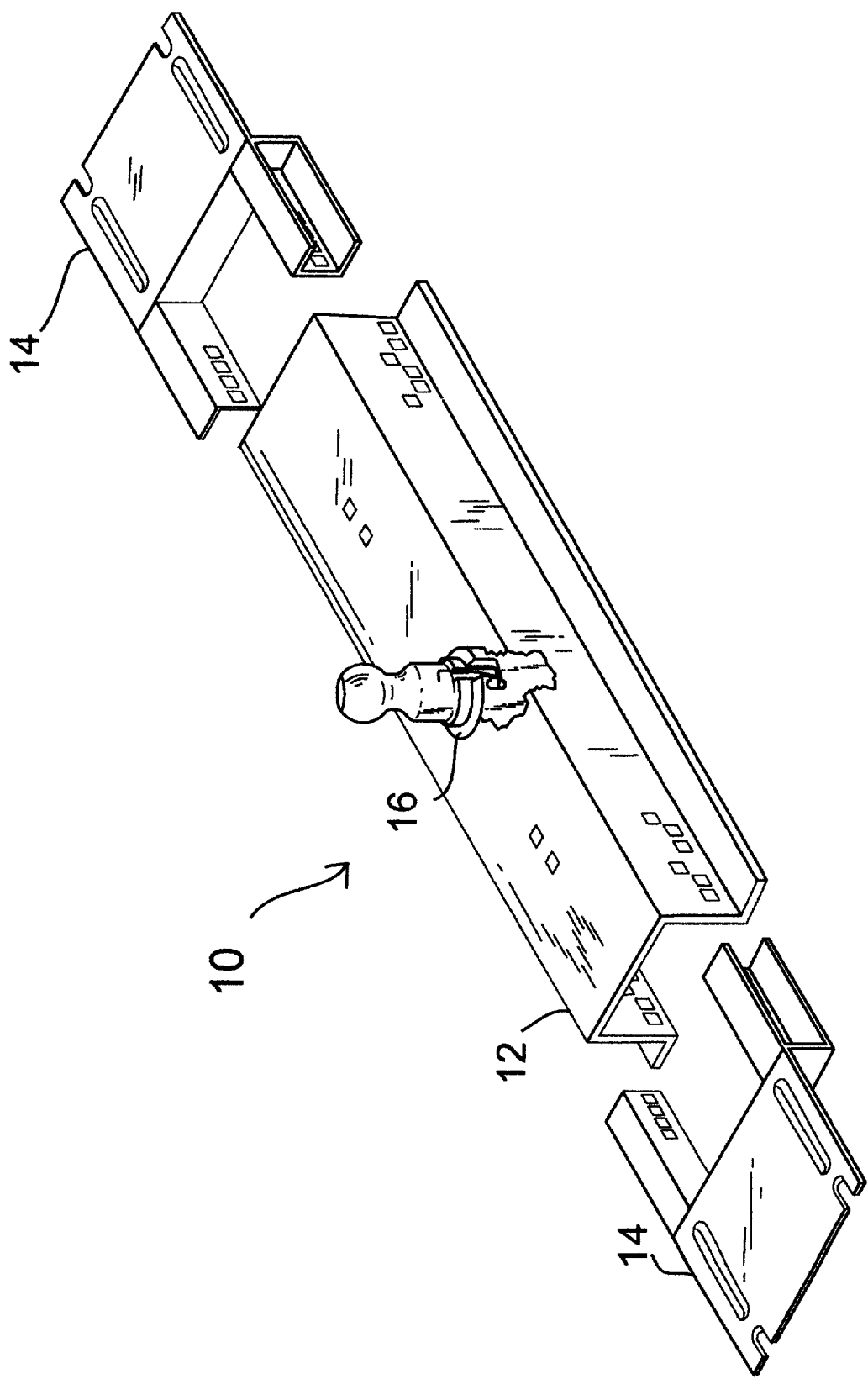
FIGS. 2 & 3 are exploded views of a preferred embodiment of hitch system of the invention.
Figure 4:
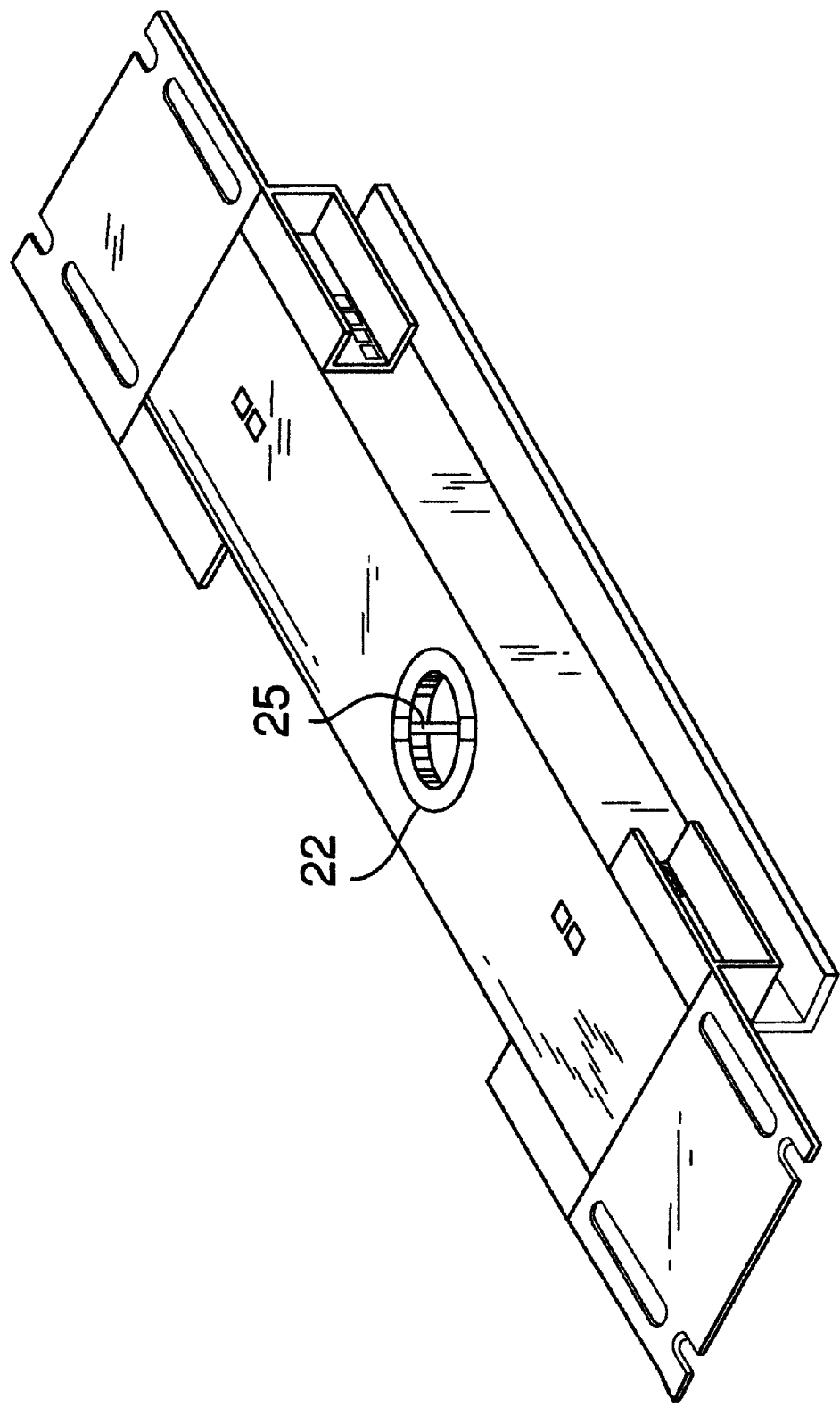
FIG. 4 shows the hitch system with the ball hitch in the inverted position.

After the base has been removed from the sleeve, it may be inverted and then inserted back into the sleeve (as shown in FIGS. 1B and 4) so that the ball does not interfere with normal use of the cargo bed of the vehicle. The lower end of the base 22 may be recessed and may include a bar 25 extending across it to facilitate lifting of the base out of the sleeve 16.

Other variants are possible without departing from the scope of this invention. For example, the second slot in the sleeve member could be positioned horizontally instead of vertically, so long as it communicates with the first slot and enables the pin 23 to pass into the second slot when the base 22 is rotated.

What is claimed is:

1. A hitch system for attachment between spaced frame members of a vehicle, the system comprising:
   (a) a mounting bracket for attachment to said frame members;
   (b) a sleeve member secured to the mounting bracket, the sleeve member having a wall which includes (i) a vertical first slot extending downwardly from the top edge of the wall, and (ii) a second slot spaced from and communicating with the first slot, the second slot not extending to the top edge of the wall;
   (c) ball hitch means including a base means which is sized to enable the base means to slide into the upper end of the sleeve member; wherein the base means further includes a pin member secured directly to and projecting outwardly from the base means and capable of being received in the first slot and being further capable of being received in said second slot when said base means is rotated relative to said sleeve member; and
   (d) lock means for preventing rotation of the ball hitch means when the pin member is located in the second slot.

2. The hitch system in accordance with claim 1, further comprising a second pin member secured directly to and projecting outwardly from said base means, and wherein said sleeve member further includes a second vertical slot for receiving said second pin member.

3. The hitch system in accordance with claim 1, wherein said base means and said sleeve member each have a circular cross-section.

4. The hitch system in accordance with claim 1, wherein said second slot is parallel to said first slot.

5. The hitch system in accordance with claim 1, further comprising a horizontal slot which communicates between said first and second slots.

6. The hitch system in accordance with claim 5, wherein said second slot includes a lower portion which extends downwardly below said horizontal slot.

7. The hitch system in accordance with claim 6, wherein said lock means further comprises a finger secured to said base means and biased outwardly therefrom.

8. The hitch system in accordance with claim 7, wherein said base means further includes a vertical channel therein.

9. The hitch system in accordance with claim 8, wherein said lever includes upper and lower ends, wherein said lower end is secured in said vertical channel, and wherein said upper end is biased outwardly.

* * * * *